(12) United States Patent
Hammerschmidt (10) Patent No.: US 9,374,174 B1
(45) Date of Patent: Jun. 21, 2016

(54) PULSE WIDTH MODULATED (PWM) SENSOR INTERFACE USING A TERMINATED SYMMETRICAL PHYSICAL LAYER

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/602,534

(22) Filed: Jan. 22, 2015

(51) Int. Cl.
*H04B 14/04* (2006.01)
*H04B 14/02* (2006.01)

(52) U.S. Cl.
CPC .................................. *H04B 14/026* (2013.01)

(58) Field of Classification Search
CPC ...................................................... H04B 14/026
See application file for complete search history.

(56) References Cited

U.S. PATENT DOCUMENTS

| | | | | |
|---|---|---|---|---|
| 5,512,853 A * | 4/1996 | Ueno | ............. | H03K 19/018514 326/21 |
| 5,559,441 A * | 9/1996 | Desroches | .......... | H04L 25/0278 324/607 |
| 6,118,350 A * | 9/2000 | Gupta | ................. | G06F 13/4086 257/536 |
| 6,728,368 B1 * | 4/2004 | Mohajeri | ............ | H04L 27/0002 370/493 |
| 2003/0093713 A1 * | 5/2003 | Werner | ............ | H01R 31/31715 714/25 |
| 2008/0034378 A1 * | 2/2008 | Kumar | ................ | G06F 13/4086 719/321 |
| 2008/0315914 A1 * | 12/2008 | Nam | .................... | H04L 25/0278 326/30 |
| 2009/0102511 A1 * | 4/2009 | Hirose | ............. | H03K 19/00384 326/30 |
| 2011/0069516 A1 * | 3/2011 | Greene | ..................... | H02J 1/10 363/126 |
| 2014/0169423 A1 | 6/2014 | Scherr | | |
| 2015/0236876 A1 * | 8/2015 | Cadugan | ................ | H04L 7/042 375/242 |

FOREIGN PATENT DOCUMENTS

DE   102008064747 B3   12/2012

OTHER PUBLICATIONS

SAE International. "SENT—Single Edge Nibble Transmission for Automotive Applications." Issued Apr. 2007.

\* cited by examiner

*Primary Examiner* — Dac Ha
(74) *Attorney, Agent, or Firm* — Eschweiler & Associates, LLC (57) ABSTRACT

A device, such as a transceiver or a sensor, is provided. An interface circuit of the device terminates a signal line with an impedance matching an impedance of the signal line. A controller of the device is configured to transmit or receive data on the signal line through the interface circuit and according to a communication protocol employing pulse width modulation (PWM) for data encoding. A system having two or more devices with impedance matching interface circuits, and a method for communication with a device having an impedance matching interface circuit, are also provided.

23 Claims, 5 Drawing Sheets

PULSE WIDTH MODULATED (PWM) SENSOR INTERFACE USING A TERMINATED SYMMETRICAL PHYSICAL LAYER

FIELD

The present disclosure relates to the physical layer of a communication system employing pulse width modulation (PWM) for data encoding.

BACKGROUND

A communication protocol is a set of rules for data exchange within or between devices. One type of communication protocol is the single edge nibble transmission (SENT) protocol. The SENT protocol is a point-to-point communication protocol for asynchronously and unidirectionally transferring nibbles of data (i.e., 4 bits of data) encoded by pulse width modulation (PWM). The SENT protocol is often applied to automotive applications to transfer high-resolution data from a sensor device to an electronic control unit (ECU) in real time. Such automotive applications include, for example, electronic power steering, throttle position sensing, pedal position sensing, airflow mass sensing, and liquid level sensing applications.

While the SENT protocol is applicable to numerous applications, it has a number of shortcomings that limit its utility. Among these shortcomings is the unidirectional and asynchronous nature of the SENT protocol. Additionally, the SENT protocol is limited to point-to-point communication. To addresses these and other shortcomings, the short PWM code (SPC) protocol can be employed to extend the SENT protocol. The SPC protocol introduces bi-directional, synchronous communication over a signal line shared by two or more devices to thereby improve upon the SENT protocol.

Despite the SPC improvements, the data rate is often still low. A communication system implementing the SPC protocol often has an open and relatively undefined physical layer (i.e., hardware layer). Further, emission control and resistance to electromagnetic injection, as called for by electromagnetic compatibility (EMC) standards, are often managed by filter structures in the physical layer. While the open nature allows for flexibility in designing the physical layer, and the filter structures serve an important role, the open nature and the filter structures also limit the ability of devices to impedance match to the signal line over a wide range of frequencies. This, in turn, limits the attainable data rate.

SUMMARY

In view of the foregoing, the present disclosure provides a physical layer for improving the data rate and impedance matching of a pulse width modulation (PWM) communication system. Examples of the communication system include a single edge nibble transmission (SENT) communication system and a short PWM code (SPC) communication system.

In some embodiments, to improve the data rate and impedance matching of a PWM communication system, two devices sharing the signal line each include a controller and an impedance matching interface circuit controlled by the controller. The interface circuit terminates the signal line, and is typically modeled as pull up and down switches for driving the signal line and a termination resistor for impedance matching. Emission control and resistance to electromagnetic injection are managed by an analog-to-digital converter (ADC) or a comparator of the interface circuit. The ADC or the comparator measures the signal line (e.g., the voltage), and respectively outputs discrete measurements at a predetermined sample rate, or a continuous binary signal, to the controller. Since each device sharing the signal line shares approximately the same physical layer, the physical layer of the PWM communication system is symmetrical about the signal line.

In other embodiments, to improve the data rate and impedance matching of the PWM communication system, at least one device of the pair includes a pull up transistor and a pull down transistor in place of the termination resistor and the pull up and down switches. The pull up and pull down transistors are employed for driving the signal line and, typically, dimensioned for impedance matching. Additionally, or alternatively, impedance matching is achieved with PWM of (i.e., by applying pulses to) the pull up and pull down transistors, optionally based on feedback from the signal line. By operating the transistors in the triode region, and controlling the pulse heights and pulse edges, the impedances of the transistors can be dynamically adjusted.

The improved data rate can be employed to improve the data encoding in order to reduce the probability of undetected bit errors. For example, the improved data rate can be employed to increase the length of checksum pulses, such as cyclic redundancy check (CRC) pulses, included in SPC messages.

DETAILED DESCRIPTION

The following detailed description makes reference to the accompanying drawings which constitute a part of the disclosure of the disclosure and in which, for purposes of illustration, special example embodiments are shown, whereby the disclosure can be practically realized. It is understood that other example embodiments may be employed, and that structural and other changes may be implemented, without going beyond the scope of protection of the present disclosure. Thus, the following detailed description should not be regarded as being limitative. Rather, the scope of protection of the present disclosure is defined only by the accompanying patent claims.

Figures 1, 2, 5:
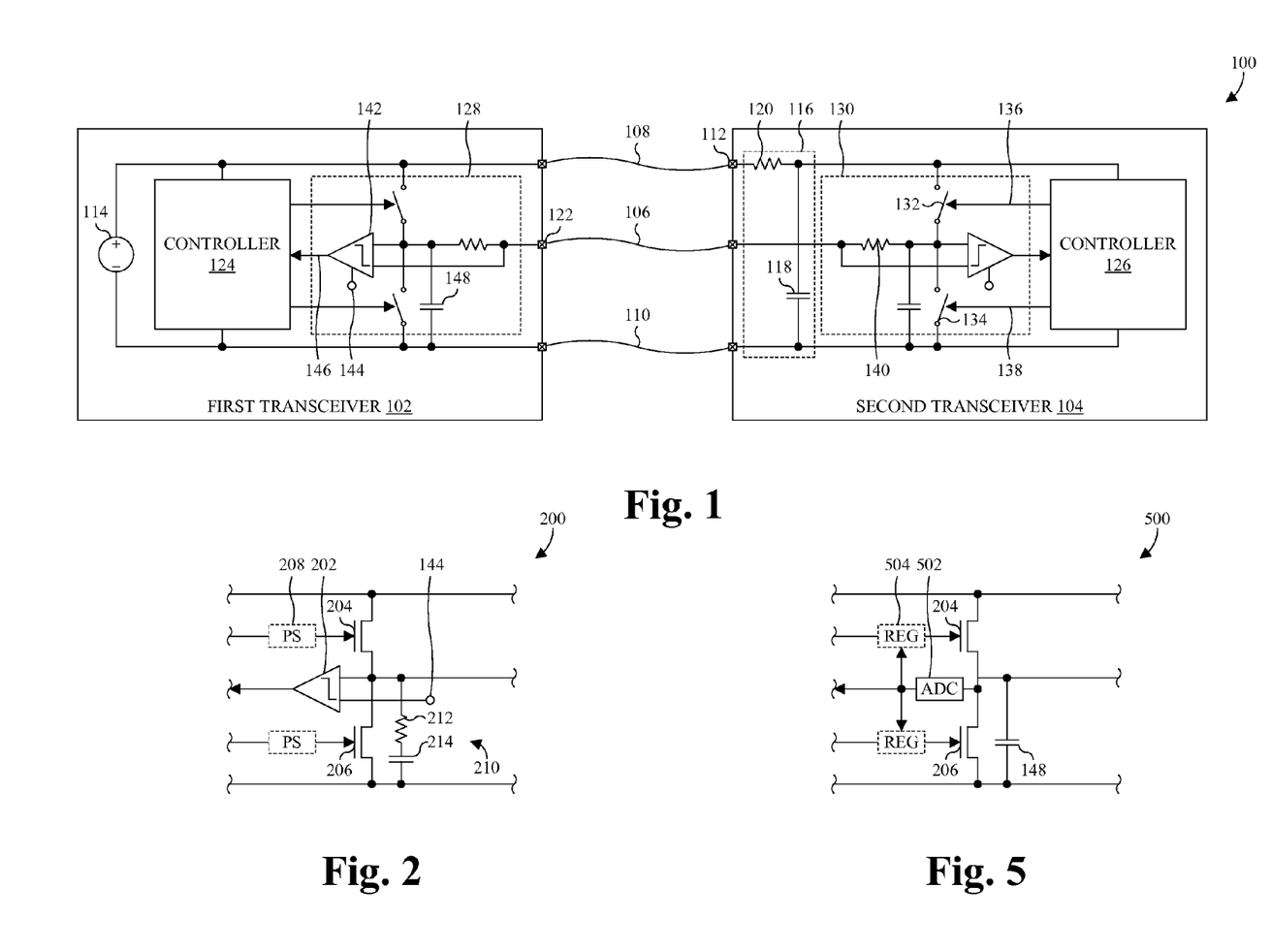
FIG. 1 illustrates the physical layer of a communication system according to some embodiments.
FIG. 2 illustrates an interface circuit according to some embodiments.
FIG. 5 illustrates an interface circuit according to alternative embodiments.

With reference to FIG. 1, a physical layer 100 of a communication system according to some embodiments is provided. The physical layer 100 corresponds to the physical hardware used to implement the communication system. Typically, the physical layer 100 is one of many abstraction layers, such as a data link or transport layer, employed to implement the communication system. For example, per the open systems interconnection (OSI) model of representing the communication system, the physical layer 100 is one of seven abstraction layers representing the communication system. Where the physical layer 100 is one of many abstraction layers, it is typically the lowest abstraction layer.

The communication system includes a first transceiver 102 and a second transceiver 104 configured to exchange data with each other according to a communication protocol. Suitably, the communication protocol encodes the data using pulse width modulation (PWM). Examples of such a communication protocol include the single edge nibble transmission (SENT) protocol, the short pulse width modulation (PWM) code (SPC) protocol, and derivatives of the SENT or SPC protocol. The communication system can be used for any application. However, the communication system is typically used for automotive applications. In such embodiments, the first transceiver 102 can, for example, be integrated with an electronic control unit (ECU) and the second transceiver 104 can, for example, be integrated with a sensor device. Automotive applications for which the communication system finds particular use include, for example, electronic power steering, throttle position sensing, pedal position sensing, airflow mass sensing, and liquid level sensing applications.

A signal line 106, a power supply line 108, and a power return line 110 extend between the first and second transceivers 102, 104. The power lines 108, 110 are connected to power connectors 112 of the first and second transceivers 102, 104 and are employed to convey power to the second transceiver 104 from a power supply 114, such as a voltage source, integrated with or otherwise associated with the first transceiver 102. In some embodiments, a filter 116 of the second transceiver 104 is connected across the power connectors 112 of the second transceiver 104 to filter noise that accumulates during power transmission over the power lines 108, 110. The filter 116 is, for example, a low pass resistor-capacitor (RC) filter having a supply capacitor 118 and a supply resistor 120 connected in series between the power connectors 112. The signal line 106 connects to the signal connectors 122 of the first and second transceivers 102, 104 and is employed to convey encoded data, such as PWM encoded data, between the first and second transceivers 102, 104 according to the communication protocol. In some embodiments, the signal line 106 has an impedance of about 50-200 Ohms.

Controllers 124, 126 and interface circuits 128, 130 are powered by the power supply 114 and correspond to the first and second transceivers 102, 104, typically with each transceiver 102, 104 including a controller 124, 126 and an interface circuit 128, 130. The controllers 124, 126 control the interface circuits 128, 130 to implement higher abstraction layers of the communication system (higher than the physical layer 100). The controllers 124, 126 can include hardware, software, or a combination of the two to implement the higher abstraction layers. For example, the controller 124 of the first transceiver 102 typically includes a microcontroller running software to implement the higher abstraction levels, and the controller 126 of the second transceiver 104 typically includes an application-specific integrated circuit (ASIC) or the like to implement the higher abstraction layers. The interface circuits 128, 130 provide the controllers 124, 126 with an interface to the signal line 106, and are arranged between corresponding controllers 124, 126 and corresponding signal connectors 122. Further, the interface circuits 128, 130 match the impedance of the signal line 106 to terminate the signal line 106. Terminating the signal line 106 advantageously avoids reflections and thus allows the rate with which data can be exchanged over the signal line 106 to be increased.

Each interface circuit 128, 130 includes a pull up switch 132 and a pull down switch 134 connected in series between corresponding power connectors 112. The pull up and pull down switches 132, 134 are electronically controlled by the corresponding controller 124, 126 through pull up and pull down control lines 136, 138. Further, a termination resistor 140 of the interface circuit 128, 130 is connected between a corresponding signal connector 122 and a shared node of the pull up switch 132 and the pull down switch 134 to terminate the signal line 106 and match the impedance of the signal line 106.

The impedance of the termination resistor 140 is selected as being between a target range. In some embodiments, the termination resistor impedance is selected as being between a target range of about 0.5 and 2.0 times the signal line impedance over all operating conditions (e.g., all operating frequencies). This achieves a reflection factor r of between about −⅓ to ⅓ over all operating conditions, and allows for a data rate twice that of the SENT protocol. The reflection factor r can be calculated as $$r = \frac{R - R_L}{R + R_L},$$

where R is the termination resistor impedance, and $R_L$ is the signal line impedance. In other embodiments, the termination resistor impedance is selected as being between a target range that is based on a target data rate. For example, a target data rate that is five times higher than that of the SENT protocol calls for a reflection factor of between about −⅐ and ⅐, and a target range of about 0.75 and 1.5 times the signal line impedance over all operating conditions.

Each interface circuit 128, 130 further includes a comparator 142 to measure the voltage drop across the corresponding termination resistor 140 while the interface circuit 128, 130 receives data. During the data reception phase of an interface circuit 128, 130, the pull up and pull down switches 132, 134 are set to a predetermined state (e.g., a pull down state, a pull up state, or a high ohmic state in which both of the pull up and pull down switches 132, 134 are active). Further, the comparator 142 compares the voltage drop across the termination resistor 140 to a reference voltage 144, which depends upon the predetermined state. Based on the comparison, the comparator 142 outputs a signal, such as binary signal, to a corresponding controller 124, 126 over an output line 146. The signal varies depending upon whether the voltage drop is above or below the reference voltage 144. In some embodiments, the comparator 142 introduces hysteresis on the binary signal. By introducing hysteresis, noise on the signal line 106 is advantageously rejected for emission control and resistance to electromagnetic injection, as called for by electromagnetic compatibility (EMC) standards. Hysteresis can be accompanied with or without reduced use of filter structures, such as RC filter structures, on the signal line 106.

In some embodiments, one or more capacitors 148, inductors, and/or other electronic components corresponding to the interface circuits 128, 130 are connected to the signal line 106. Such electronic components 148 can, for example, be employed to filter noise on the signal line 106, and/or to provide an alternating current (AC) path from the comparator 142 inputs to the power return line 110 for those cases where both of the pull up and pull down switches 132, 134 are active and high ohmic). To the extent that the interface circuits 128, 130 include such electronic components 148, the electronic components 148 are selected so that the effect of the electronic components 148 on the input impedances of the interface circuits 128, 130 is negligible. That is to say, over all operating conditions (e.g., all operating frequencies) of the signal line 106, the influence of the electronic components 148 on the input impedance does not shift the input impedance outside the target range (e.g., about 0.5-2.0 times the impedance of the signal line impedance).

During operation of the communication system, one of the first and second transceivers 102, 104 drives the signal line 106 with encoded data and the other one of the first and second transceivers 102, 104 receives the encoded data. To drive the signal line 106 with encoded data, the controller 124, 126 of the driving transceiver 102, 104 receives data, such as sensor data, to transmit, and encodes the data into a series of pulses with defined transients or widths. The pulses are then generated on the signal line 106 by selectively pulling the signal line 106 high or low using the pull up or pull down switches 132, 134. To receive encoded data over the signal line 106, the comparator 142 of the receiving transceiver 102, 104 continuously measures the voltage over the signal line 106 and outputs a binary signal. The controller 124, 126 of the receiving transceiver 102, 104 then analyzes the transients of pulses in the binary signal to decode data encoded therein.

Employing termination resistors 140 advantageously allows the signal line 106 to be terminated and the impedance matched for better signaling. By terminating the signal line 106 and, in some embodiments, omitting filter structures, the data rate on the signal line 106 can be increased. This increased data rate can be employed to convey additional data, such as increased checksum data and/or increased payload data. Even more, by using the same interface circuits 128, 130 with the first and second transceivers 102, 104, the physical layer 100 takes on a symmetry about the signal line 106 that simplifies the design of the physical layer 100 and the operation of the communication system. Both the first and second transceivers 102, 104 send and receive data on the signal line 106 in the same manner.

With reference to FIG. 2, an interface circuit 200 according to some embodiments is provided. The interface circuit 200 can be used in place of one or both of the interface circuits 128, 130 of FIG. 1. The interface circuit 200 includes a comparator 202 that measures the voltage on a signal line (e.g., the signal line 106 of FIG. 1) while receiving data. The comparator 202 compares the voltage on the signal line to a reference voltage 144, such as 1.5 volts, and outputs a binary signal to a corresponding controller (e.g., a controller 124, 126 of FIG. 1) based on the comparison. In some embodiments, the comparator 202 implements hysteresis on the binary signal to improve compliance with EMC standards. Hysteresis can be accompanied with or without reduced use of filter structures, such as RC filter structures, on the signal line. Such filter structures often increase the input capacitance of transceivers, which impacts the impedance matching and limits attainable data rates.

A pull up transistor 204 and a pull down transistor 206 are connected in series between corresponding power connectors (e.g., power connectors 112 of FIG. 1). Examples of the pull up and pull down transistors 204, 206 are metal-oxide-semiconductor field-effect transistors (MOSFETs). Typically, the pull up transistor 204 is p-type MOSFET and the pull down transistor 206 is an n-type MOSFET. The pull up and pull down transistors 204, 206 are electronically controlled by the controller through pull up and pull down control lines (e.g., the control lines 136, 138 of FIG. 1) to drive the signal line and transmit encoded data. In some embodiments, the controller controls the pull up and pull down transistors 204, 206 by applying pulses 208 with defined shapes (e.g., heights and edges) and defined transients to the pull up and pull down transistors 204, 206. For example, by operating the pull up and pull down transistors 204, 206 in the triode region, the pulses 208 can adjust the impedance of the pull up and pull down transistors 204, 206 and therefore offer finer control when driving the signal line. Further, in some embodiments, the controller receives feedback from the comparator 202 to dynamically adjust the pulses 208 to better control the shapes and/or transients of the pulses on the signal line.

Beyond use for driving the signal line, the pull up and pull down transistors 204, 206 are also used to define a termination impedance selected as described above. The termination impedance can be defined by appropriately dimensioning and/or controlling the pull up and pull down transistors 204, 206. In some embodiments, each of the pull up and pull down transistors 204, 206 is dimensioned so as to have the termination impedance. In such embodiments, only one of the pull up and pull down transistors 204, 206 is typically activated or conducting at any one time. In other embodiments, where the termination impedance needs to more accurately match the signal line impedance (e.g., to obtain a higher data rate), the pulses 208 are applied to the pull up and pull down transistors 204, 206 through the pull up and pull down control lines to adjust the termination impedance. In such embodiments, the pulses 208 are generated so that one or both of the pull up and pull down transistors 204, 206 are conducting at any one time.

The impedance of a pull up or pull down transistor 204, 206 can be controlled through the gate source voltage while the transistor 204, 206 is in the triode region. The relationship between gate source voltage and impedance is known to those skilled in the art, and depends upon the technology parameters (e.g., type of transistor) of the transistor 204, 206 and the design dimensions (e.g., width and length) of the transistor 204, 206. Further, in some embodiments, the fabrication spread (i.e., variances during the manufacture of the transistor 204, 206) and/or temperature are taken into account to better model the relationship between gate source voltage and impedance. Since the gate source voltage of the transistor 204, 206 can be used to vary the impedance of the transistor 204, 206, the impedance of the transistor 204, 206 can be varied through control of the shape (e.g., height and/or edges) of the pulses 208 applied to the transistor 204, 206. For example, the pulses 208 can generated with defined slopes or edges while transiting between states.

A challenge with the foregoing is that the if a pull up or pull down transistor 204, 206 enters the saturation region, deviations from the target impedance may appear. Such deviations typically begin for a transistor 204, 206 turning on while a transition on the signal line begins and the drain source voltage of the transistor 204, 206 is still high. To address this challenge, the pulses applied to the pull up transistor 204 are coordinated with the pulses applied to the pull down transistor 206 so the edges of the pulses 208 applied to the transistor 204, 206 overlap and one of the transistors 204, 206 is turning off while the other transistor is turning on. When deviations begin as described above, the transistor 204, 206 that is turning off is still in the triode region, thereby allowing the overall impedance of the two transistors 204, 206 to be collectively controlled and matched to the signal line.

Figure 3:
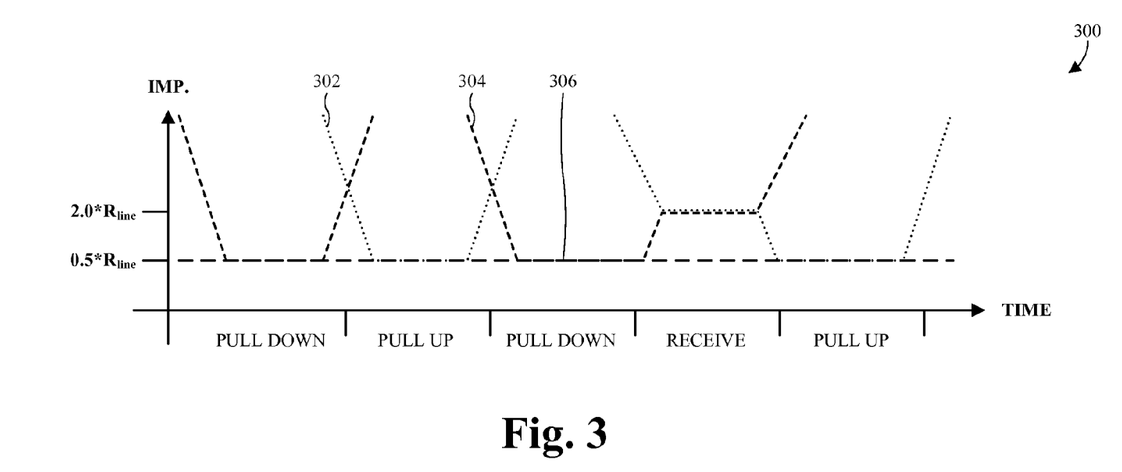
FIG. 3 illustrates some embodiments of a control scheme for an interface circuit.

With reference to FIG. 3, a graph 300 of impedance as a function of time illustrates a control scheme of the interface circuit 200 according to some embodiments. Impedance is shown for the pull up transistor by a first line 302, for the pull down transistor by a second line 304, and for a termination resistor by a third line 306. As noted above, the pull up transistor 204 is typically a p-type MOSFET and the pull down transistor 206 is typically an n-type MOSFET. Time is demarcated into a pull down period, a pull up period, and a receive period of the interface circuit 200.

As illustrated by FIG. 3, the edges of the pulses 208 (i.e., the gate source voltages) for the pull up and pull down transistors are overlapping so the parallel connection of both of the pull up and pull down transistors 204, 206 stays approximately in a target range of about 0.5-2.0 times the signal line impedance. Further, during the receive period, both of the transistors 204, 206 are tuned approximately to about 2.0 times the signal line impedance. A shortcoming with the control scheme is that current consumption is high. Current consumption can be calculated as the supply voltage divided by 4 times the signal line impedance. Notwithstanding this control scheme, other control schemes with more or less overlap of the impedances and different settings for the receive period may be employed.

Figure 4:
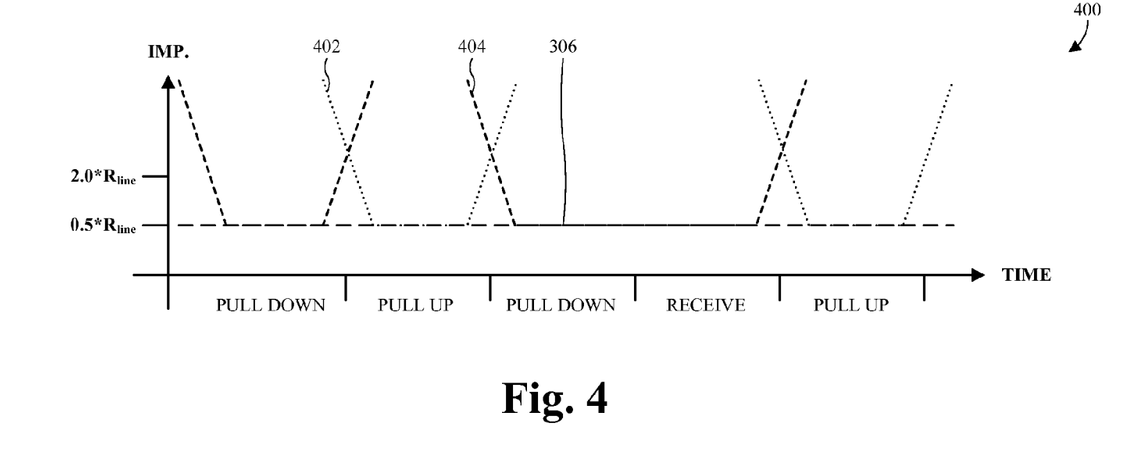
FIG. 4 illustrates alternative embodiments of a control scheme for an interface circuit.

With reference to FIG. 4, a graph 400 of impedance as a function of time illustrates an alternative control scheme of the interface circuit 200 according to some embodiments. Impedance is shown for the pull up transistor by a first line 402, for the pull down transistor by a second line 404, and for a termination resistor by a third line 306.

As illustrated by FIG. 4, the edges of the pulses 208 for the pull up and pull down transistors 204, 206 are overlapping so the parallel connection of both of the pull up and pull down transistors 204, 206 stays approximately in a target range of about 0.5-2.0 times the signal line impedance. Further, during the receive period, the pull up and pull down transistors 204, 206 are placed in a defined state. For example, during the receive period, the pull up transistor 204 is activated and the pull down transistor is deactivated (i.e., the interface circuit 200 is placed in a pull down state). Advantageously, the control scheme does not lead to cross current during the receive period and is simpler than the control scheme of FIG. 3. On the other hand, the voltage levels that have to be decoded and the current load for the transmitter are asymmetrical. Notwithstanding this control schemes, other control schemes with more or less overlap of the impedances and different settings for the receive period may be employed.

With reference back to FIG. 2, in some embodiments, the termination impedance is further adjusted with an AC load network 210 connected to the signal line. For example, the AC load network 210 may be a serial connection of a resistor 212 and a capacitor 214. Advantageously, the AC load network 210 allows the control ranges of the transistor impedances to be adjusted or shifted, since the AC load network 210 is in parallel. Typically, the RC time constant of the AC load network 210 is chosen so the behavior is approximately resistive for the operating frequency range of the signal line.

With reference to FIG. 5, an interface circuit 500 according to some embodiments is provided. The interface circuit 500 can be used in place of one or both of the interface circuits 128, 130 of FIG. 1. The interface circuit 500 includes an ADC 502 measuring the voltage on a signal line (e.g., the signal line 106 of FIG. 1) at a predetermined sample rate. For example, the ADC 502 periodically measures the voltage by comparing the signal line voltage to one or more reference voltages at the predetermined sample rate and outputs digital values to a corresponding controller (e.g., a controller 124, 126 of FIG. 1). In other embodiments, a comparator (not shown) is used in place of the ADC 502 to continuously measure the voltage on the signal line by, for example, comparing the signal line voltage to a reference voltage and outputting a binary signal. In measuring the voltage on the signal line, regardless of whether the ADC 502 or the comparator are used, noise is filtered out for compliance with EMC standards without the use of filter structures on the signal line.

A pull up transistor 204 and a pull down transistor 206 are connected in series between corresponding power connectors (e.g., power connectors 112 of FIG. 1). Examples of the pull up and pull down transistors 204, 206 are MOSFETs. The pull up and pull down transistors 204, 206 are electronically controlled by the controller through pull up and pull down control lines (e.g., the control lines 136, 138 of FIG. 1) to drive the signal line and transmit encoded data. Beyond use for driving the signal line, the pull up and pull down transistors 204, 206 are also used to define a termination impedance selected as described above. In that regard, one or both of the pull up and pull down transistors 204, 206 are dimensioned and/or controlled so as to have a target impedance within a target range (e.g., 0.5-2.0 times the signal line impedance).

The pull up and pull down transistors 204, 206 are electronically controlled by the controller, and/or corresponding regulators 504, as described in FIG. 2. However, in contrast with FIG. 2, the pull up and pull down transistors 204, 206 are also electronically controlled based on measurements from the ADC 502 or the comparator (i.e., feedback from the signal line). For example, as illustrated, the controller selectively activates the regulators 504 to pull the signal line up or down. In response to being activated, a regulator 504 selectively pulses the corresponding pull up or pull down transistor 204, 206 to achieve an impedance matching of the signal line, as determined based on the measurements from the ADC 502 or the comparator. As another example, the controller selectively pulses the pull up and pull down transistors 204, 206 to achieve an impedance matching of the signal line, as determined based on the measurements from the ADC 502 or the comparator, and without the use of the regulators 504.

In some embodiments, the controller and/or the corresponding regulators 504 use the measurements from the ADC 502 or the comparator to determine control gate voltages for control of the pull up and pull down transistors 204, 206. For example, the controller and/or the corresponding regulator 504 measure the voltage on the signal line using the ADC 502 or the comparator. Thereafter, a drain source voltage of one of the transistors 204, 206 is determined. For the pull up transistor 204, the drain source voltage is calculated as the difference between the supply line voltage and the measured voltage. For the pull down transistor 206, the drain source voltage is the measured voltage. Thereafter, drain source current is calculated by dividing the drain source voltage with the known impedance of the signal line. Further, for the pull up transistor 204, the quotient is multiplied by negative one since current flows in the opposite direction as the pull down transistor 206. With the drain source current, a gate source voltage of the transistor 204, 206 is calculated as a function of the drain source voltage and the drain source current using a transistor model of the transistor 204, 206. The transistor model returns a gate source voltage that achieves an impedance within a target range (e.g., 0.5-2.0 times the signal line impedance), while keeping the transistor 204, 206 in the triode region. In some embodiments, the transistor model can take into account the fabrication spread and/or temperature to better determine the gate source voltage.

Having determined the control gate voltages for the pull up and pull down transistors 204, 206, the controller and/or the corresponding regulators 504 apply pulses (not specifically shown) to the pull up and pull down transistors 204, 206 based on the control gate voltages. This can be achieved as described above in FIG. 2 and/or in accordance with either one of the control schemes of FIGS. 3 and 4. Edge shaping of the pulses and/or hand over between the pull up and pull down transistors 204, 206 can be controlled by redistribution of current between the pull up and pull down transistors 204, 206 (e.g., by successively turning off the pull down transistor 206 while the pull up transistor 204 is turning on). The speed of the process can be controlled in a way that the measured voltage is changing with the desired slew rate unless one of the transistors 204, 206 is turned off.

In some embodiments, the termination impedance is further adjusted with an AC load network (not shown) connected to the signal line. For example, the AC load network may be a serial connection of a capacitor and a resistor. Advantageously, the AC load network allows the control ranges of the transistor impedances to be adjusted or shifted, since the AC network is in parallel. Typically, the RC time constant of the AC load network is chosen so the behavior is approximately resistive for the operating frequency range of the signal line.

Although not shown, one or both of the interface circuits 128, 130 of FIG. 1 can be replaced with alternative interface circuits, such as the interface circuits 200, 500 of FIGS. 2 and 5. For example, the interface circuit 130 of the second transceiver 104 can be replaced with the interface circuit 200, 500 of FIG. 2 or 5. As another example, the interface circuit 128 of the first transceiver 102 can be replaced with the interface circuit 200 of FIG. 2, and the interface circuit 130 of the second transceiver 104 can be replaced with the interface circuit 500 of FIG. 5. As yet another example, at least one of the interface circuits 128, 130 of FIG. 1 can be replaced with an interface circuit having the pull up and pull down transistors replaced with a current steering digital-to-analog converter (DAC) and a current mirror.

Figure 6:
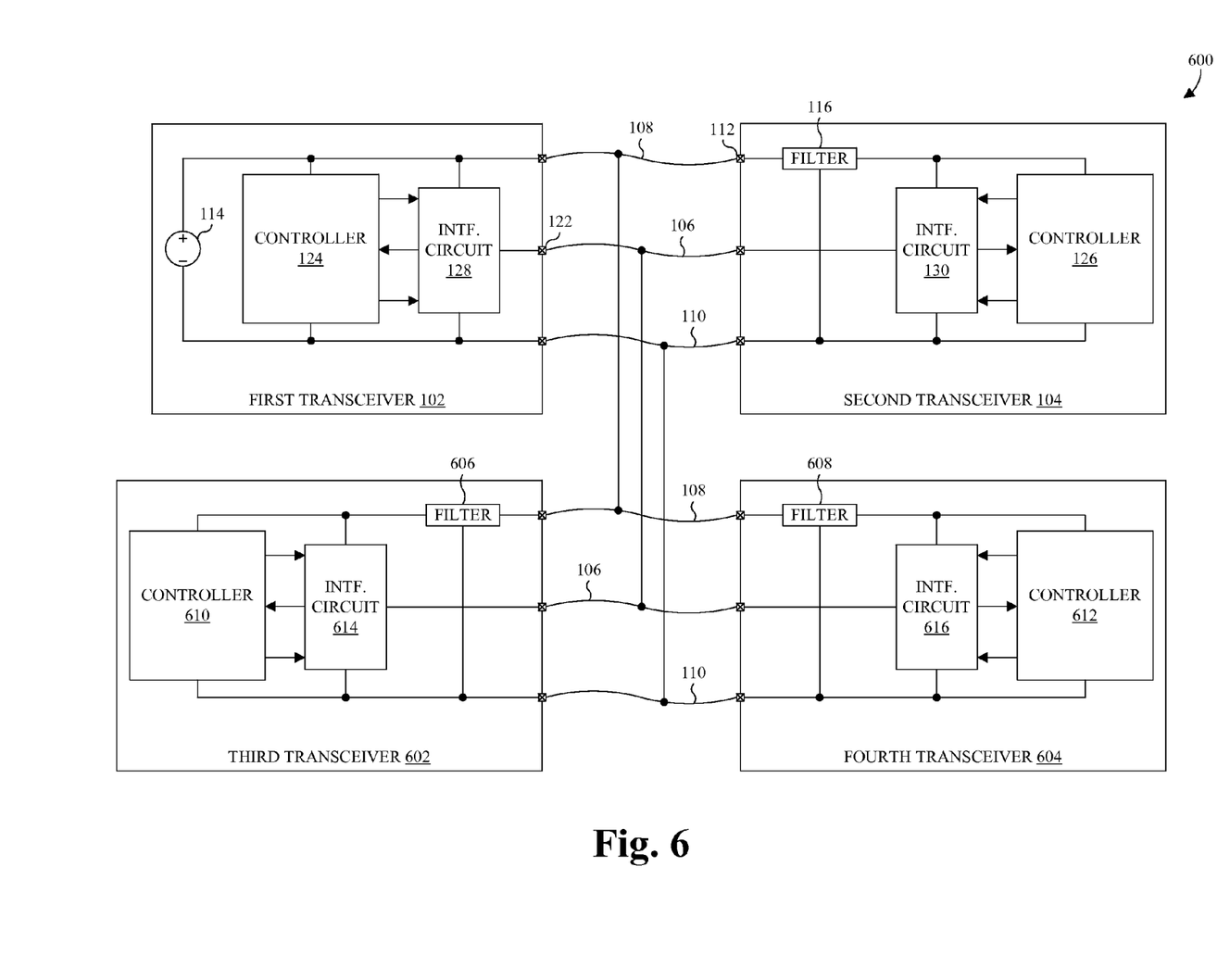
FIG. 6 illustrates the physical layer of a communication system having more than two transceivers sharing a signal line according to some embodiments.

With reference to FIG. 6, a physical layer 600 of a communication system according to some embodiments is provided. In contrast with the physical layer 100 of FIG. 1, more than two transceivers 102, 104, 602, 604 are connected to a signal line 106 and configured to exchange data with each other according to a communication protocol. Suitably, the communication protocol encodes the data using PWM. Examples of such communication protocols include the SENT protocol, the SPC protocol, and derivatives of the SENT or SPC protocol.

The communication system includes a first transceiver 102, a second transceiver 104, and one or more additional transceivers 602, 604. The one or more additional transceivers 602, 604 include, for example, a third transceiver 602 and a fourth transceiver 604, and are as described above for the second transceiver 104. The communication system can be used for any application. However, the communication system is typically used for automotive applications. Automotive applications for which the communication system finds particular use include, for example, electronic power steering, throttle position sensing, pedal position sensing, airflow mass sensing, and liquid level sensing applications.

The signal line 106, along with a power supply line 108 and a power return line 110, extend between the transceivers 102, 104, 602, 604. The power lines 108, 110 are connected to power connectors 112 of the transceivers 102, 104, 602, 604 and are employed to convey power to the second and additional transceiver 104, 602, 604 from a power supply 114 integrated with or otherwise associated with the first transceiver 102. In some embodiments, filters 116, 606, 608 corresponding to the second and additional transceiver 104, 602, 604 are connected across power connectors 112 of the second and additional transceivers 104, 602, 604 to filter noise that accumulates during power transmission over the power lines 108, 110.

Controllers 124, 126, 610, 612 and interface circuits 128, 130, 614, 616 powered by the power supply 114 correspond to the transceivers 102, 104, 602, 604, typically with each transceiver 102, 104, 602, 604 including a controller 124, 126, 610, 612 and an interface circuit 128, 130, 614, 616. The controllers 124, 126, 610, 612 control the interface circuits 128, 130, 614, 616 to implement higher abstraction layers of the communication system (higher than the physical layer 600). The interface circuits 128, 130, 614, 616 provide the controllers 124, 126, 610, 612 with an interface to the signal line 106, and are arranged between corresponding controllers 124, 126, 610, 612 and corresponding power connectors 112. Further, the interface circuits 128, 130, 614, 616 match the impedance of the signal line 106 to terminate the signal line 106 and to improve the rate with which data can be exchanged over the signal line 106.

Because there are more than two transceivers 102, 104, 602, 604 on the signal line 106, the transceivers 102, 104, 602, 604 match the signal line impedance with consideration of each other. For example, one of the transceivers 102, 104, 602, 604, typically the first transceiver 102, matches the impedance of the signal line 106 and each other transceiver 102, 104, 602, 604 matches n times the impedance of the signal line 106, where n is the number of other transceivers 102, 104, 602, 604. Further, the signal line 106 is maintained at a defined level, such as ground, by one or more of the transceivers 102, 104, 602, 604 when data is not being driven to the signal line 106. As another example, the communication protocol includes a system of tokens to achieve impedance matching.

According to the system of tokens, only two transceivers 102, 104, 602, 604 can have tokens at any one time. Further, a transceiver 102, 104, 602, 604 to receive or transmit data requests and acquires a token according to the communication protocol before receiving or transmitting data. Those transceivers 102, 104, 602, 604 with tokens match the signal line impedance with a termination impedance, determined as described above, and those transceivers 102, 104, 602, 604 without tokens switch to a high impedance state (relative to the transceivers 102, 104, 602, 604 with tokens). The high impedance state can be achieved by, for example, opening both of the pull up and pull down switches or transistors 132, 134, 204, 206 (see FIGS. 1-3). According to alternative embodiments of the system of tokens, one of the transceivers 102, 104, 602, 604, typically the first transceiver 102, always has a token (implied or explicit) and the other transceivers 102, 104, 602, 604 share the other token.

Figure 7:
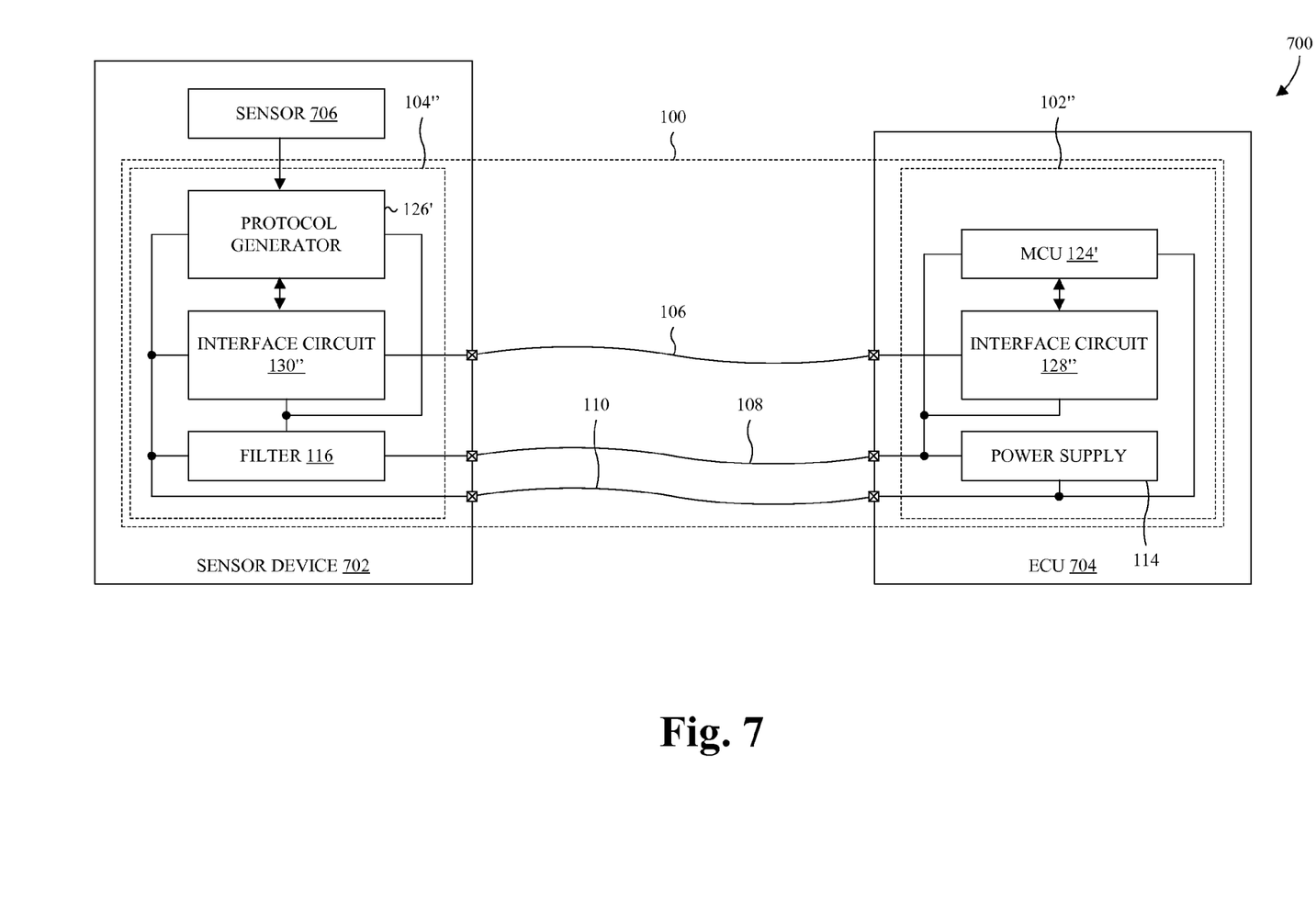
FIG. 7 illustrates the physical layer of a sensor system according to some embodiments.

With reference to FIG. 7, a sensor system 700 according to some embodiments is provided. The sensor system 700 can, for example, include the communication system of FIG. 1. The sensor system 700 is typically employed for automotive applications, but it can be applied to other applications. Automotive applications for which the sensor system finds particular use include, for example, electronic power steering, throttle position sensing, pedal position sensing, airflow mass sensing, and liquid level sensing applications. The sensor system includes a sensor device 702 communicating with and powered by a remote ECU 704 respectively over a signal line 106, a power supply line 108, and a power return line 110.

The ECU 704 provides power to the sensor device 702 over the power lines 108, 110 from a power supply 114 of the ECU 704. Further, the ECU 704 receives and decodes data from the sensor device 702 over the signal line 106 using a transceiver 102". A microcontroller unit (MCU) 124' controls an interface circuit 128" of the transceiver 102" and receives the data from the sensor device 702 over the signal line 106. The interface circuit 128" terminates the signal line 106 with a matched impedance, and includes an ADC or comparator (not shown) for filtering noise on the signal line 106 and providing the MCU 124' with measurements of the signal line 106. Examples of the interface circuit 128" are described in FIGS. 1-3. Upon receiving the filtered signal, the MCU 124' decodes the encoded data thereon and carries out post processing activities using the decoded data. For example, the MCU 124' can activate a dashboard light of a vehicle in response to receiving sensor data that indicates that washer fluid is low.

The sensor device 702 receives power from the ECU 704 over the power lines 108, 110 and filters the received power using a filter 116. Further, the sensor device 702 generates sensor data using a sensor 706, and transmits the sensor data to the ECU 704 over the signal line 106 using a transceiver 104". The sensor 706 can be, for example, a resistive sensor, an optoelectric sensor, or the like. The sensor data includes, for example, the position of a vehicle brake pedal, the speed with which a vehicle is traveling, etc. The transceiver 104" encodes the signal data into a series of pulses and drives the signal line 106 with the series of pulses. The transceiver 104" includes a protocol generator 126' and an interface circuit 130". The protocol generator 126' controls the interface circuit 130" and drives encoded data to the signal line 106. The interface circuit 130" terminates the signal line 106 with a matched impedance. Examples of the interface circuit 130" are described in FIGS. 1-3.

Although not shown, the sensor system 700 can employ any of the above described embodiments of the communication system and the physical layer. For example, the sensor system 700 can include one or more additional sensors, each including corresponding additional transceivers described in FIG. 6.

Figure 8:
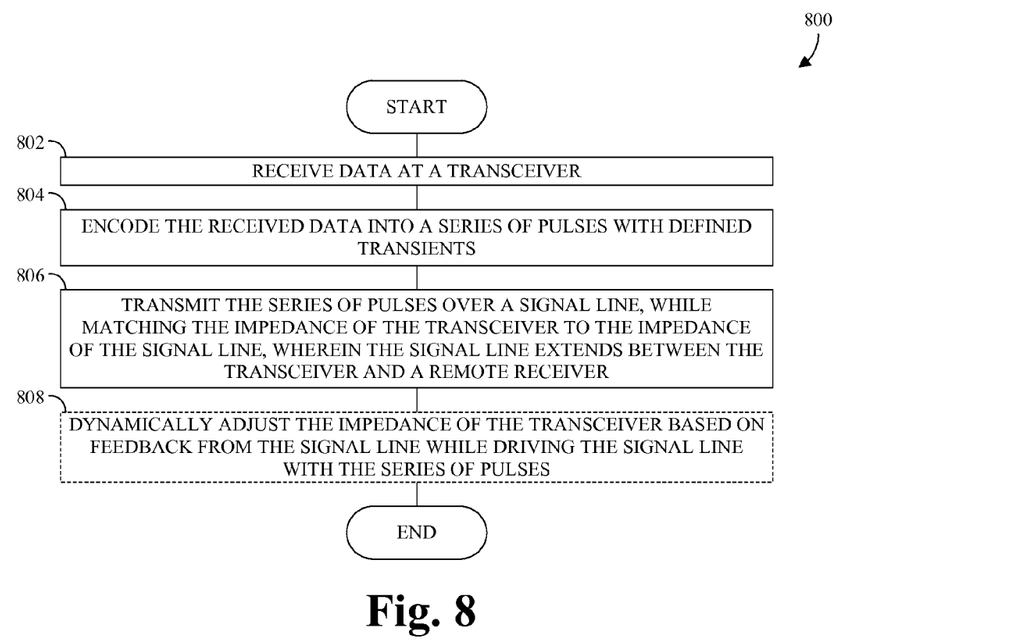
FIG. 8 illustrates a flowchart of a method for transmitting data according to some embodiments.

With reference to FIG. 8, a flowchart 800 illustrates a method for transmitting data according to some embodiments.

At 802, data is received at a transceiver. The data is, for example, sensor data. The transceiver is, for example, any one of the transceivers described above.

At 804, the received data is encoded into a series of pulses with defined transients. The encoding can be, for example, according to the SENT or SPC protocols and is typically performed by a controller, such as a microcontroller.

At 806, the series of pulses are transmitted over a signal line, while simultaneously matching the impedance of the transceiver to the impedance of the signal line. The signal line extends between the transceiver and a remote receiver. The series of pulses are typically driven to the signal line by selectively activating pull up and/or down switches or pull up and/or down transistors to pull the signal line up (e.g., to +5 volts) or down (e.g., to ground). Typically, the pull up and/or pull down switches or transistors are controlled by the controller. In some embodiments, impedance matching is achieved by a termination resistor connected between the signal line and the pull up and/or pull down switches or transistors. Additionally or alternatively, in some embodiments, impedance matching is achieved by dimensioning the pull up and/or pull down transistors, and/or pulsing the pull up and/pull down switches or transistors with pulses having defined shapes (e.g., heights and/or edges).

In some embodiments, at 808, the impedance of the transceiver is dynamically adjusted based on feedback from the signal line while driving the signal line. For example, the pull up and/or down switches or transistors are pulsed to match the impedance of the signal line. The dynamic adjustment can be controlled by the controller and/or regulators.

Figure 9:
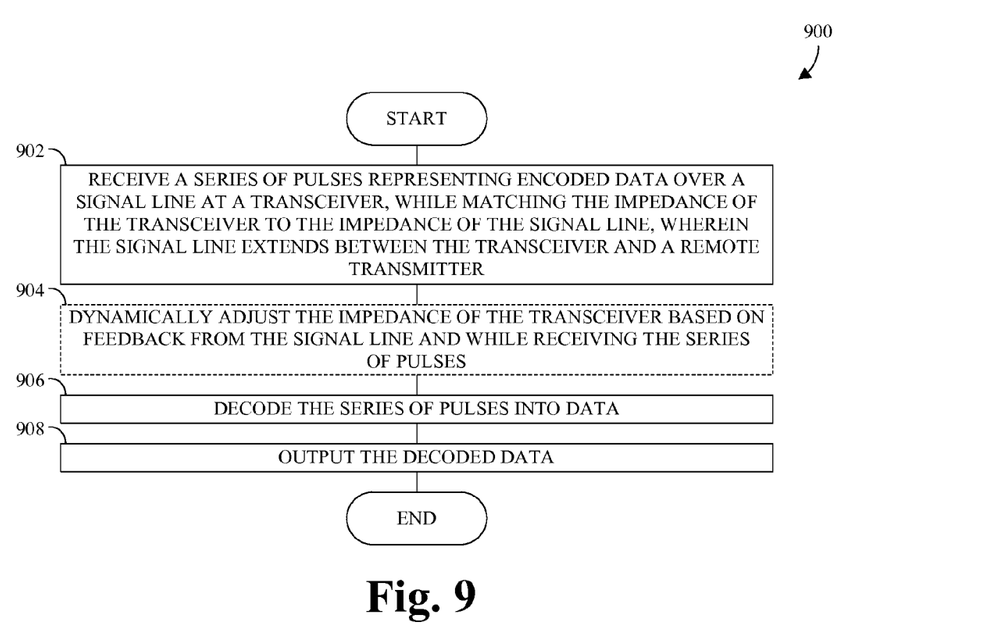
FIG. 9 illustrates a flowchart of a method for receiving data according to some embodiments.

With reference to FIG. 9, a flowchart 900 illustrates a method for receiving encoded data according to some embodiments.

At 902, a series of pulses representing encoded data are received over a signal line at a transceiver, while simultaneously matching the impedance of the transceiver to the impedance of the signal line. The signal line extends between the transceiver and a remote transmitter. The encoded data is, for example, encoded sensor data. The transceiver is, for example, any one of the transceivers described above. The series of pulses are typically received from the signal line by a controller, such as a microcontroller, through a comparator or ADC connected to the signal line. The comparator or ADC measures the signal line (e.g., voltage) and respectively outputs a continuous binary signal or discreet measurements at a predetermined sample rate. In some embodiments, impedance matching is achieved by a termination resistor connected between the signal line and the comparator or ADC. Additionally or alternatively, impedance matching is achieved by dimensioning pull up and/or pull down transistors connected to the signal line, and/or pulsing pull up and/or down switches or transistors connected to the signal line with defined shapes (e.g., heights and/or edges).

In some embodiments, at 904, the impedance of the transceiver is dynamically adjusted based on feedback from the signal line while receiving the series of pulses. For example, the pull up and/or down switches or transistors are pulsed to match the impedance of the signal line. The dynamic adjustment can be controlled by the controller and/or regulators.

At 906, the series of pulses are decoded into data. The decoding can be, for example, according to the SENT or SPC protocols and is typically performed by the controller.

At 908, the decoded data is output for downstream use. For example, an airbag can be deployed in response to receiving data indicative of a vehicle crash.

Thus, as can be appreciated from above, the present disclosure provides a device. The device includes an interface circuit terminating a signal line with an impedance matching an impedance of the signal line. Further, the device includes a controller configured to transmit or receive data on the signal line through the interface circuit and according to a communication protocol employing PWM for data encoding.

In other embodiments, the present disclosure provides a system. The system includes a first device and one or more additional devices. The first device includes a first interface circuit terminating a signal line with an impedance matching an impedance of the signal line. Further, the first device includes a first controller configured to transmit or receive data on the signal line through the first interface circuit and according to a communication protocol employing PWM for data encoding. The one or more additional devices terminate the signal line with an impedance matching the impedance of the signal line. Further, the one or more additional devices are configured to transmit or receive data on the signal line according to the communication protocol.

In yet other embodiments, the present disclosure provides a method for communication is provided. A series of pulses are transmitted or received over a signal line at a transceiver, while simultaneously matching an impedance of the transceiver to an impedance of the signal line. Further, data is encoded into the series of pulses and/or the series of pulses are decoded into decoded data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A device comprising:
   an interface circuit terminating a signal line with an impedance matching an impedance of the signal line, wherein the interface circuit includes:
      a pull up switch and a pull down switch connected in series; and
      a termination resistor connected between a shared node of the pull up and down switches and the signal line, wherein an impedance of the termination resistor matches the impedance of the signal line; and
   a controller configured to transmit or receive data on the signal line through the interface circuit and according to a communication protocol employing pulse width modulation (PWM) for data encoding.

2. The device according to claim 1, wherein the controller is configured to transmit or receive the data according to a single edge nibble transmission (SENT) communication protocol or a short PWM code (SPC) communication protocol.

3. The device according to claim 1, further including:
   a sensor generating the data, wherein the controller is configured to encode the data according to the communication protocol and to drive the signal line with the encoded data through control of the interface circuit.

4. The device according to claim 1, wherein the interface circuit impedance is between about 0.5-2.0 times the signal line impedance.

5. The device according to claim 1
   wherein the controller is configured to control the pull up and down switches to transmit the data on the signal line.

6. The device according to claim 5, wherein the termination resistor includes a first terminal connected to the signal line, and a second terminal connected to a power supply line or a power return line through a capacitor.

7. The device according to claim 1, wherein the interface circuit includes:
   a comparator or analog-to-digital converter (ADC) configured to measure a voltage on the signal line and to output a binary measurement signal to the controller; and
   wherein the controller is configured to receive the data from the binary measurement signal and to decode the received data according to the communication protocol.

8. The device according to claim 7, further including:
   an alternating current (AC) load network connected to the signal line, wherein the AC load network includes a resistor in series with a capacitor.

9. A system comprising:
   a first device including:
      a first interface circuit terminating a signal line with an impedance matching an impedance of the signal line, wherein the first interface circuit includes a pull up transistor and a pull down transistor connected in series, and wherein a shared node of the pull up and pull down transistors is connected to the signal line; and
      a first controller configured to transmit or receive data on the signal line through the first interface circuit and according to a communication protocol employing pulse width modulation (PWM) for data encoding, and is further configured to apply pulses to gates of the pull up and down transistors to dynamically match the impedance of the signal line; and
   one or more additional devices terminating the signal line with an impedance matching the impedance of the signal line and configured to transmit or receive data on the signal line according to the communication protocol.

10. The device according to claim 9, wherein the first controller is configured to control the pull up and down transistors to transmit the data on the signal line.

11. The device according to claim 10, wherein the pull up and down transistors are dimensioned to match the impedance of the signal line.

12. The device according to claim 10, wherein the first controller or a regulator intermediate the first controller and one of the pull up and down transistors is configured to apply pulses to the one of the pull up and down transistors to match the impedance of the signal line based on feedback from the signal line.

13. The device according to claim 12, wherein heights and edges of the pulses are shaped to keep a combined impedance of the pull up and pull down transistors in a range that matches the signal line impedance.

14. The device according to claim 9, wherein heights of the pulses are dimensioned to match impedances of the pull up and pull down transistors to the signal line impedance.

15. The system according to claim 9, wherein the one or more additional devices include:
   a second device including:
      a second interface circuit terminating the signal line with an impedance matching the impedance of the signal line; and
      a second controller configured to transmit or receive data on the signal line through the second interface circuit and according to the communication protocol.

16. The system according to claim 15, wherein the first and second interfaces circuits have the same arrangement of electrical components.

17. The system according to claim 9, wherein the one or more additional devices each have an input impedance being n times the impedance of the signal line, where n is the number of additional devices connected to the signal line.

18. The system according to claim 9, wherein the one or more additional devices are configured to share a token according to the communication protocol, and wherein an additional device having the token is configured to match the impedance of the signal line and to transmit or receive data on the signal line.

19. The system according to claim 9, wherein the first controller is configured to apply the pulses to the pull up and down transistors to maintain at least one of the pull up and down transistors in a triode region.

20. A method for communication, said method comprising:
   transmitting or receiving a series of first pulses over a signal line at a transceiver, while simultaneously matching an impedance of the transceiver to an impedance of the signal line;
   at least one of:
      encoding data into the series of first pulses; and
      decoding the series of first pulses into decoded data; and
   dynamically adjusting the impedance of the transceiver by applying second pulses to gates of a pull up transistor and a pull down transistor both connected to the signal line, wherein the second pulses are based on feedback from the signal line while transmitting or receiving the series of first pulses.

21. The method according to claim 20, further including:
receiving the series of first pulses by:
- comparing a voltage on the signal line to a reference voltage; and
- generating a binary output signal based on the comparing.

22. The method according to claim 20, further including:
transmitting the series of first pulses by selectively activating the pull up and down transistors.

23. The method according to claim 20, further comprising:
adjusting shapes of the second pulses to maintain a combined impedance of the pull up and pull down transistors in a range that matches the impedance of the signal line.

* * * * *